United States Patent
Kowalevicz et al.

(10) Patent No.: US 10,924,189 B2
(45) Date of Patent: *Feb. 16, 2021

(54) CONSTANT ENVELOPE PATH-DEPENDENT PHASE MODULATION

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,916

(22) Filed: Jan. 31, 2020

(65) Prior Publication Data
US 2020/0295839 A1    Sep. 17, 2020

Related U.S. Application Data

(63) Continuation of application No. 16/352,284, filed on Mar. 13, 2019, now Pat. No. 10,554,306.

(51) Int. Cl.
*H04B 10/556* (2013.01)
*H04L 27/20* (2006.01)
*H04B 10/516* (2013.01)

(52) U.S. Cl.
CPC ....... *H04B 10/5561* (2013.01); *H04B 10/516* (2013.01); *H04L 27/2096* (2013.01)

(58) Field of Classification Search
CPC ................ H04B 10/548–5561; H04L 27/2096
See application file for complete search history.

(56) References Cited

U.S. PATENT DOCUMENTS

| 4,495,477 | A | 1/1985 | Weber |
| 4,750,192 | A | 6/1988 | Dzung |
| 5,608,560 | A | 3/1997 | Abram et al. |
| 8,055,137 | B2 | 11/2011 | Wang et al. |
| 9,509,411 | B2 | 11/2016 | D'Errico |

(Continued)

FOREIGN PATENT DOCUMENTS

EP    3442187 A1    2/2019

*Primary Examiner* — Casey L Kretzer
(74) *Attorney, Agent, or Firm* — Lando & Anastasi, LLP

(57) ABSTRACT

Optical transmitters configured to modulate optical signals with a path-dependent phase modulation scheme. In certain examples, an optical transmitter includes an optical source that emits a carrier waveform, a modulator configured to modulate the carrier waveform according to a path-dependent phase modulation scheme to produce a modulated optical signal, a mapping module configured to map a data payload to the path-dependent phase modulation scheme, each symbol in the path-dependent phase modulation scheme including a concatenation of at least one location bit and a path bit, the at least one location bit identifying an amount of a phase transition in the modulated optical signal and the path bit identifying a direction of the phase transition, and a pulse-shaping filter configured to control the modulator, based on an output from the mapping module, to impose the path-dependent phase modulation scheme on the carrier waveform to generate the modulated optical signal.

20 Claims, 6 Drawing Sheets

(56) References Cited

U.S. PATENT DOCUMENTS

| | | | |
|---|---|---|---|
| 9,929,813 B1* | 3/2018 | Batshon | H04B 10/516 |
| 10,177,856 B2 | 1/2019 | Kowalevicz et al. | |
| 10,225,020 B2 | 3/2019 | Dolgin et al. | |
| 10,243,670 B2 | 3/2019 | Kowalevicz et al. | |
| 10,305,602 B2 | 5/2019 | Dolgin et al. | |
| 2008/0226300 A1 | 9/2008 | Mayer et al. | |
| 2011/0274436 A1 | 11/2011 | McNicol et al. | |
| 2018/0054259 A1 | 2/2018 | Kowalevicz et al. | |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |
| 2018/0091232 A1 | 3/2018 | Dolgin et al. | |
| 2018/0102853 A1 | 4/2018 | Dolgin et al. | |
| 2018/0145764 A1 | 5/2018 | Dolgin et al. | |
| 2018/0145765 A1 | 5/2018 | Kowalevicz et al. | |
| 2018/0167145 A1 | 6/2018 | Dolgin et al. | |
| 2018/0234231 A1 | 8/2018 | Dolgin et al. | |
| 2018/0367223 A1 | 12/2018 | Graceffo et al. | |
| 2019/0007091 A1 | 1/2019 | Graceffo et al. | |
| 2019/0050956 A1* | 2/2019 | Kossin | H04L 9/0891 |
| 2019/0158208 A1 | 5/2019 | Dolgin et al. | |

* cited by examiner

CONSTANT ENVELOPE PATH-DEPENDENT PHASE MODULATION

CROSS-REFERENCE TO RELATED APPLICATIONS

This application claims priority under 35 U.S.C. § 120 as a continuation of U.S. patent application Ser. No. 16/352,284, filed on Mar. 13, 2019, and titled "CONSTANT ENVELOPE PATH-DEPENDENT PHASE MODULATION" which is incorporated by reference herein in its entirety.

BACKGROUND

Many optical communication systems manipulate light waves to carry information. For instance, often a light source (e.g., a laser source) is modulated to change various properties of emitted light, such as an amplitude, phase, or frequency of the light to convey information. Phase modulation, also called phase shift keying (PSK), is a commonly used communications technique in which information, in symbols, is encoded onto a carrier signal using phase changes. Phase shift modulation provides $\log_2(2^N)$ bits per symbol, where N is the number of symbols in the complex signal plane. For example, binary phase shift keying (BPSK) has two symbols or one bit per symbol. Quadrature phase shift keying (QPSK) has four symbols or two bits per symbol.

SUMMARY OF INVENTION

In many applications, it would be desirable to map more bits per symbol without introducing additional overhead (e.g., without increasing the required transmission bandwidth) or latency. Aspects and embodiments disclosed herein present such a technique.

According to one embodiment, an optical transmitter is configured to transmit a modulated optical signal and comprises an optical source configured to emit a carrier waveform, and a modulator configured to modulate the carrier waveform according to a path-dependent phase modulation scheme to produce the modulated optical signal. The optical transmitter further comprises a mapping module configured to map a received data payload to the path-dependent phase modulation scheme, each symbol in the path-dependent phase modulation scheme including a concatenation of at least one location bit and at least one path bit, the at least one location bit corresponding to a current location of the symbol in a symbol constellation corresponding to the path-dependent phase modulation scheme, and the at least one path bit representing a clockwise or counter-clockwise rotation from a prior location of the symbol to the current location of the symbol in a complex plane of the symbol constellation, and a pulse-shaping filter configured to control the modulator, based on an output from the mapping module, to impose the path-dependent phase modulation scheme on the carrier waveform to generate the modulated optical signal.

In one example, the at least one location bit represents a value of lower order bits at the current location of the symbol.

In another example, the at least one path bit is a highest order bit in the symbol.

In one example, the clockwise or counter-clockwise rotation is a rotation of 180 degrees.

In another example, the clockwise rotation represents a zero bit and the counter-clockwise rotation represents a one bit.

The optical transmitter may further comprise a forward error correction module configured to receive the data payload and to apply a forward error correcting code to the data payload.

In one example, the modulator is an electro-optic modulator.

According to another embodiment, an optical transmitter configured to transmit a modulated optical signal comprises an optical source configured to emit a carrier waveform, a modulator configured to modulate the carrier waveform according to a path-dependent phase modulation scheme to produce the modulated optical signal, a mapping module configured to map a received data payload to symbols according to the path-dependent phase modulation scheme, each symbol, S, including a concatenation of at least one location bit, L, and at least one path bit, P, such that S=[PL], where L represents $\log_2(2^N)$ bits, there being N symbol locations defined in a symbol constellation corresponding to the path-dependent phase modulation scheme, and a pulse-shaping filter configured to control the modulator, based on an output from the mapping module, to impose the path-dependent phase modulation scheme on the carrier waveform to generate the modulated optical signal, each symbol corresponding to a phase transition in the modulated optical signal, with the at least one location bit, L, identifying an amount of phase change corresponding to the phase transition, and the at least one path bit, P, identifying whether the phase change is positive or negative.

In one example, the amount of phase change corresponding to the phase transition is pi radians.

The optical transmitter may further comprise a forward error correction module configured to receive the data payload and to apply a forward error correcting code to the data payload.

In one example, a positive phase change represents a one bit and a negative phase change represents a zero bit.

According to another embodiment, an optical transmitter configured to transmit a modulated optical signal comprises an optical source configured to emit a carrier waveform, a modulator configured to modulate the carrier waveform according to a path-dependent phase modulation scheme to produce the modulated optical signal, a mapping module configured to map a received data payload to the path-dependent phase modulation scheme, each symbol in the path-dependent phase modulation scheme including a concatenation of at least one location bit and at least one path bit, the at least one location bit identifying an amount of a phase transition in the modulated optical signal and the at least one path bit identifying a direction of the phase transition, and a pulse-shaping filter configured to control the modulator, based on an output from the mapping module, to impose the path-dependent phase modulation scheme on the carrier waveform to generate the modulated optical signal.

In one example, the amount of the phase transition is an integer multiple of pi radians.

In another example, the at least one path bit is a highest order bit in the symbol.

In another example, each symbol, S, is defined by S=[PL], where L corresponds to the at least one location bit and represents $\log_2(2^N)$ bits, there being N symbol locations defined in a symbol constellation corresponding to the path-dependent phase modulation scheme, and P corresponds to the at least one path bit.

In one example, a clockwise direction of the phase transition corresponds to a zero bit and a counter-clockwise direction of the phase transition corresponds to a one bit.

The optical transmitter may further comprise a forward error correction module configured to receive the data payload and to apply a forward error correcting code to the data payload.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to methods and apparatus for detecting the direction of phase change in a phase-modulated signal, and using that information to encode additional information onto the phase-modulated signal by increasing the number of bits per symbol. As discussed in detail below, this additional information can be added to the signal without increasing the required bandwidth for the signal and without introducing undesirable effects into the signal, such as latency errors or changes in the signal envelope (amplitude variations).

Figure 1:
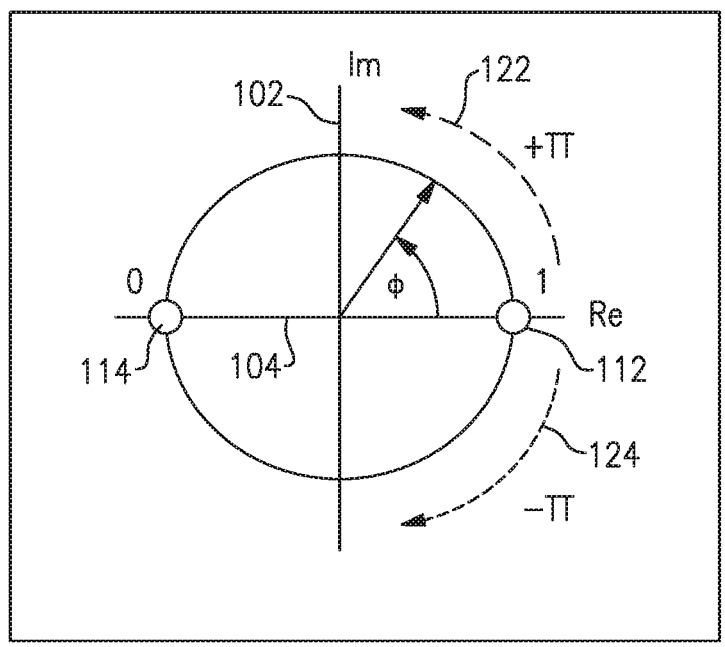
FIG. 1 is a diagram of the complex plane representation of a binary phase shift keying (BPSK) signal constellation.

As discussed above, phase shift modulation provides $\log_2(2^N)$ bits per symbol, where N is the number of symbols in the complex signal plane. The value of each symbol is determined by the location of the symbol in the plane. For example, FIG. 1 is the complex plane representation of a binary phase shift keying (BPSK) signal constellation. In the diagram, the vertical axis 102 is the imaginary axis and the horizontal axis 104 is the real axis. There are two symbols 112, 114 in the plane, both of which are located on the horizontal axis 104. The first symbol 112 located to the right of the origin is at a phase angle of 0 radians, while the second symbol 114 to the left of the origin is located at a phase angle of pi radians (180 degrees). The phase angle φ is determined by the rotation of a vector originating at the origin and pointing along the horizontal axes in the positive (towards the right in FIG. 1) direction. Such a vector rotating in the counter-clockwise direction constitutes a positive phase rotation, indicated by arrow 122. In the example shown in FIG. 1, a rotation of pi radians is shown. A vector rotating in a clockwise direction constitutes a negative rotation, indicated by arrow 124; in this case a rotation of −pi radians.

In conventional BPSK communication, a receiver is unable to determine whether a transmit modulator rotated the signal phase in a clockwise or counter-clockwise direction to reach the next phase state. In other words, in conventional BPSK communication, the receiver cannot tell the difference between a rotation of +pi and a rotation of −pi. Aspects and embodiments provide a component of the receiver (e.g., the demodulator) with the ability to make such a determination. Accordingly, further aspects and embodiments are directed to a modulation scheme that exploits the ability to determine the direction of phase change when moving between phase states, in order to provide an additional information bit. While the approach is explained below using BPSK, this method is applicable to all M-ary (e.g., binary, quaternary, etc.) and QAM modulation schemes.

Figure 2:
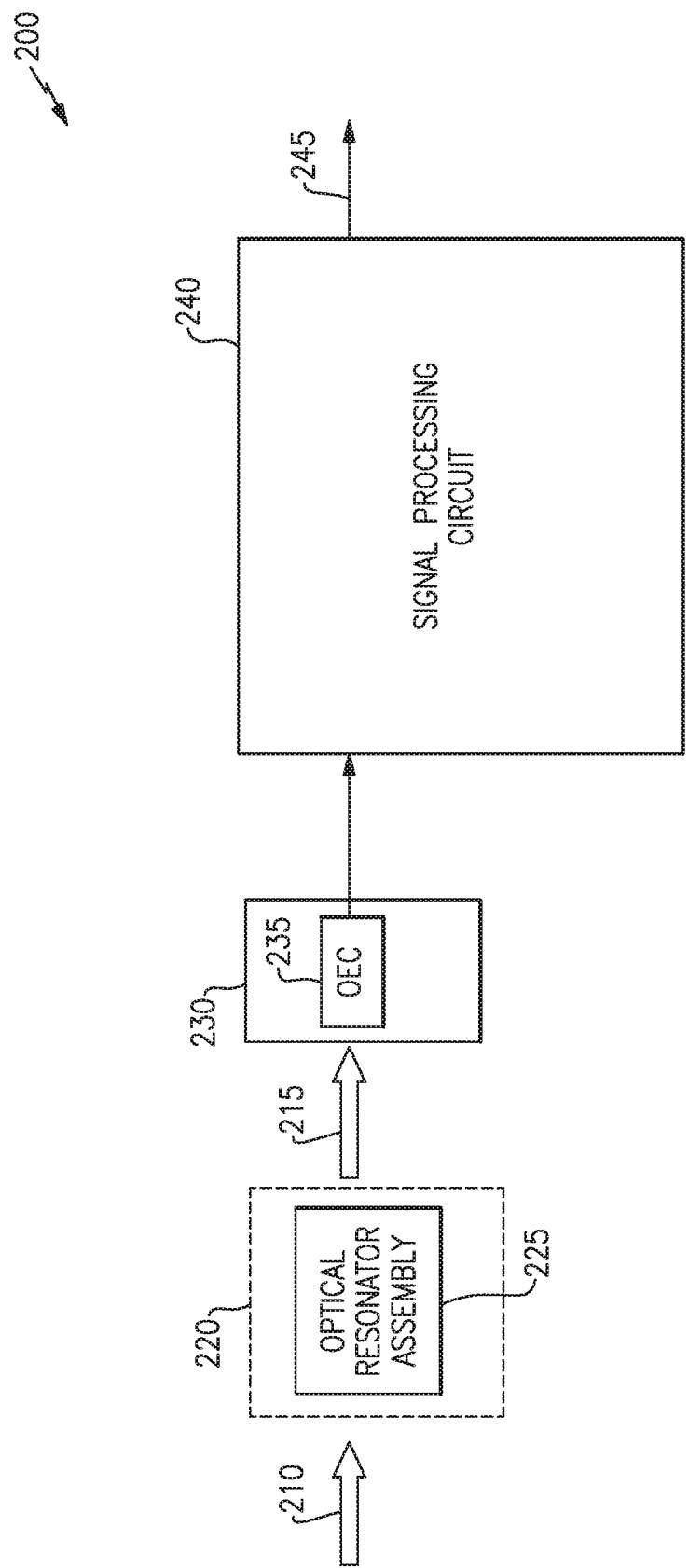
FIG. 2 is a functional block diagram of one example of a receiver according to aspects of the present invention.

FIG. 2 is a block diagram of one example of an optical receiver according to certain embodiments. The optical receiver 200 receives a modulated optical signal 210 transmitted along a free space signal path (e.g., free space optical, FSO), a fiber coupling, or another waveguide system from a transmitter (not shown). The optical receiver 200 includes a phase change detector 220 that includes an optical resonator assembly 225, a detector assembly 230 including at least one optical-electrical converter (OEC) 235, and a signal processing circuit 240. In certain examples, the detector assembly 230 and the signal processing circuit 240 may be collectively referred to as a detector. The detector assembly 230 and the signal processing circuit 240 may be separate components or may be part of a common module. The optical resonator assembly 225 is positioned to receive the modulated optical signal 210 and to produce an output optical signal 215 that has characteristics representative of the modulation of the modulated optical signal 210, as discussed further below. The detector assembly 230 receives the output optical signal 215 from the optical resonator assembly 225 and the at least one OEC 235 converts the optical signal into an electrical signal that can be processed by the signal processing circuit 240 to produce a decoded information signal 245. The decoded information signal 245 may include the information that was encoded on the modulated optical signal 210 by the modulation of the modulated optical signal 210. The OEC 235 may include one or more photo-diodes, for example, or other components capable of transforming an optical signal into an electrical signal. The signal processing circuit 240 may include various components, as will be understood by those skilled in the art, such as analog-to-digital converters, filters, amplifiers, controllers, etc., to condition and process the electrical signals received from the detector assembly 230 to produce the decoded information signal 245.

In certain examples, the optical resonator assembly 225 includes one or more optical resonators configured to convert phase modulation of the modulated optical signal 210 into an intensity modulation, containing both phase change and direction of phase change, of the output optical signal 215. As used herein, the term "optical resonator" refers to a component capable of sensing variations, such as frequency variations, amplitude variations, or phase variations in the received optical signal 210. Examples of optical resonators may include Fabry-Perot etalons, micro-rings, or other types of optical resonators. Each optical resonator in the optical resonator assembly 225 converts the modulation of the arriving optical signal 210 in part by interaction of the arriving optical signal 210 with optical energy built-up in the resonator. Individual optical resonators within the optical resonator assembly 225 may be operated in a resonant or non-resonant mode. Operation of an optical resonator as a phase change detector is discussed below using the example of an etalon; however, those skilled in the art will appreciate that other types of optical resonators can be operated according to similar principles. With the inclusion of one or more optical resonators, the optical resonator assembly 225 provides a phase change detector that can also detect the direction of the phase change, as discussed in more detail below.

Figure 3:
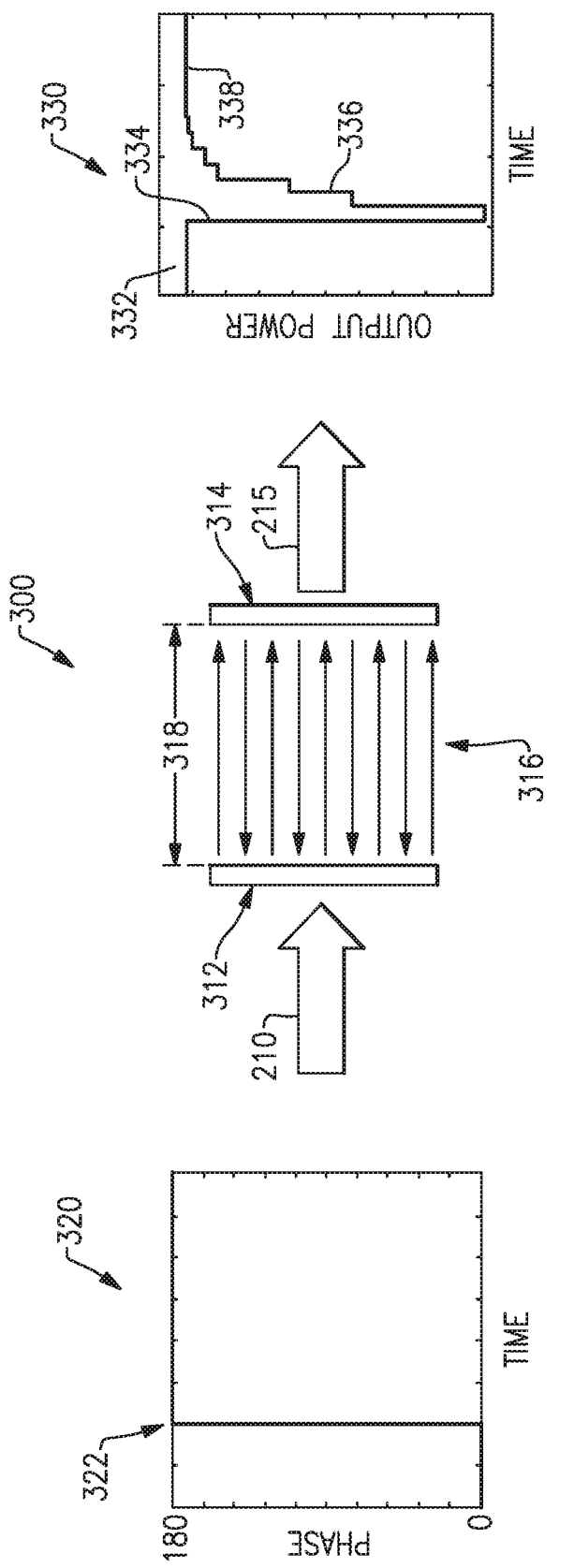
FIG. 3 is a diagram illustrating an example of operation of an etalon according to aspects of the present invention.

Referring to FIG. 3, in certain examples an etalon 300 is a component having a pair of parallel semi-reflective surfaces 312, 314 that may include a dielectric material in between, and has a characteristic resonant frequency associated with a certain wavelength of light based upon the spacing (i.e., dimension 302) between the semi-reflective surfaces. The surfaces 312, 314 are semi-reflective and also semi-transmissive, in that they allow some light through, and therefore the arriving modulated optical signal 210 may be allowed into the etalon 300 and may resonate inside the etalon (i.e., in the interior 316 between the two semi-reflective surfaces 312, 314). Additionally, some of the light resonating inside is allowed out of the etalon 300 (through at least one of the semi-transmissive surfaces). Light emerging from the etalon 300 is shown, for example, as the output optical signal 215.

The optical signal 210 received by the etalon 300 establishes a steady-state energy-conserving condition in which optical signal energy continuously arrives at the etalon 300, adds to the built-up resonating energy existing inside the etalon 300, and emerges from the etalon 300 at a constant rate. If the frequency, amplitude, or phase of the arriving optical signal 210 changes, this change causes a temporary disruption to the resonance inside the etalon 300 and the light intensity emerging from the etalon 300 is also disrupted, until a steady state condition is re-established. Accordingly, a change in phase, frequency, or amplitude of the arriving optical signal 210 causes a change in intensity of the output optical signal 215. Thus, the etalon functions as a modulation converter, for the optical signal 210. The output optical signal 215 may therefore carry the same information content as the arriving optical signal 210, but in an intensity modulated form, rather than a phase modulated form, for example.

FIG. 3 illustrates an example of the above-described operation of the etalon 300. FIG. 3 shows a graph 320 of the arriving modulated optical signal 210, showing a phase change in the optical signal 210. The graph 320 plots the phase (vertical axis) of the optical signal 210 over time (horizontal axis), showing a phase transition of pi (180 degrees) at point 322. FIG. 3 also shows a graph 330 of optical signal intensity (as output power) emerging from the etalon 300 during the phase transition in the received optical signal 210. At region 332 the etalon 300 is in a steady-state resonance condition wherein a steady intensity of light emerges. At point 334, corresponding to point 322 in the graph 320, a phase transition occurs in the arriving optical signal 210, temporarily disrupting the steady-state and causing a drop in the emerging light intensity. During successive reflections inside the etalon 300, and indicated region 336 in the graph 330, resonance is re-establishing, and the emerging light intensity increases until, at point 338, a steady intensity of light emerges when the etalon 300 has returned to a steady-state condition. Thus, variations in the intensity of the output optical signal 215 from the etalon 300 indicate that a transition occurred in the arriving optical signal 210, such as a phase transition due to phase modulation of the optical signal 210.

The etalon 300 may have varying levels of reflectivity of the semi-reflective surfaces 312, 314. In certain examples, the reflectivity may be expressed as a fraction of light amplitude reflected back into the interior 316, or may be expressed as a fraction of light intensity reflected back into the interior 316. The reflectivity of each of the first and second semi-reflective surfaces 312, 314 may be the same or different, and may be any suitable value for a particular implementation. The etalon 300 is one example of a suitable optical resonator in accord with aspects and embodiments described herein. However, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples. Additionally, other optical resonators, such as an optical loop or micro-ring, for example, may operate according to similar principles and also be used in the optical resonator assembly 225. For example, optical signal energy accumulated in the loop/micro-ring may constructively or destructively interfere with itself, at certain frequencies (wavelengths), and such constructive or destructive interaction may be disturbed by a phase change in an arriving optical signal 210. Accordingly, phase changes in the arriving optical signal 210 may be detected and interpreted to demodulate the arriving optical signal 210.

Any change in amplitude or phase of the arriving optical signal 210 at the optical resonator assembly 225 may cause a variation in the output optical signal 215. In the example discussed above, the etalon 300 is operated in a resonant mode or condition. However, wavelengths of the arriving optical signal 210 that do not create a resonant response in the etalon 300 may nonetheless establish the output optical signal 215. Under such a condition, the etalon 300 (or other optical resonator) may be described as being untuned or detuned from the particular wavelength(s). A phase transition in the modulated optical signal 210 received by a detuned optical resonator causes a disturbance in the output optical signal from that resonator despite the lack of resonance. In addition, a phase shift in one direction may cause a greater disturbance in a particular resonator than a phase shift of the same magnitude in an opposite direction (e.g., a positive phase shift versus a negative phase shift may cause different disturbances in the output optical signal from an optical resonator).

According to certain examples, an optical resonator, such as the etalon 300, will develop a steady-state output signal based on the input signal, and maintain a given level of the output optical signal 215 until a phase transition of the arriving optical signal 210 occurs. As discussed above, when a phase modulation transition occurs in the input optical signal 210, self-interference (constructive or destructive) may cause a phase-dependent transient disturbance in the intensity of the output optical signal 215. Such a transient disturbance may depend upon the tuning of the etalon (or other optical resonator). Accordingly, the optical resonator assembly 225 may include one or more etalons 300 (or other optical resonators) having various states of tuning relative to a wavelength, $\lambda$ of the arriving optical signal 210. For example, referring again to FIG. 3, a tuned etalon 300 may have an optical interior dimension 318 (e.g., based upon the speed of light in the material of the interior 316) that is an integer number of half-wavelengths, e.g., $L=n\lambda/2$. A detuned etalon may be positively detuned by having a slightly larger dimension, e.g., $L=n\lambda/2+\varepsilon$, or be negatively detuned by having a slightly smaller dimension, e.g., $L=n\lambda/2-\varepsilon$. In some embodiments, the dimensional variant, $\varepsilon$, may have a nominal value of one eighth wavelength, e.g., $\varepsilon=\lambda/8$. In other embodiments, the dimensional variant may have a nominal value of a tenth of a wavelength, e.g., $\varepsilon=\lambda/10$, or a twelfth of a wavelength, $\varepsilon=\lambda/12$. Other embodiments may have different nominal dimensional variants, $\varepsilon$, and any dimensional variant, $\varepsilon$, may be more or less precise in various embodiments. Additionally, a positively detuned optical resonator with respect to a particular wavelength may be a negatively detuned optical resonator with respect to another wavelength. Accordingly, in some embodiments, tuning relative to a particular wavelength may be less significant than a difference in tuning between two or more optical resonators. For example, the positively and negatively detuned resonator dimensions discussed above may be equivalently described with respect to two optical resonators as being detuned by $2\varepsilon$ relative to each other, without regard to what wavelength might produce resonance in either of the optical resonators and/or an alternate or additional tuned resonator.

As shown in FIG. 3 and discussed above, the output intensity/power from a tuned etalon 300 exhibits a transient disturbance (a temporary reduction in power in the example shown in FIG. 3 although in other configurations the transient disturbance may instead be a temporary increase) in response to a phase transition occurring in the arriving modulated optical signal 210. Similarly, a phase transition in the arriving modulated optical signal 210 causes a transient disturbance in the output intensity from a detuned etalon; however, the transient disturbance is different depending on whether the phase transition is a phase advance (e.g., +pi) or a phase retreat (e.g., −pi). For example, a positively detuned etalon may have a more pronounced or prominent (e.g., larger transient peak or dip) response to a phase advance than to a phase retreat of the same value. In other words, the change in intensity of the output signal 215 from a positively detuned etalon may be greater in response to a phase advance (e.g., +pi) than to a phase retreat (e.g., −pi). Similarly, the change in intensity of the output signal 215 from a negatively detuned etalon may be greater in response to a phase retreat (e.g., −pi) than to a phase advance of the same value (e.g., +pi). These differences in the response from the etalon based on its tuning state may allow the receiver to distinguish between positive and negative phase transitions in the arriving modulated optical signal 210.

The response and operation of various examples of etalons and other optical resonators in different tuning states to different phase (and other modulation) transitions in an arriving optical signal are discussed in more detail in commonly-owned U.S. Patent Publication No. 2018-0145764 titled "DEMODULATION OF QAM MODULATED OPTICAL BEAM USING FABRY-PEROT ETALONS AND MICRORING DEMODULATORS" and U.S. Patent Publication No. 2018-0102853 titled "SYSTEMS AND METHODS FOR DEMODULATION OF PSK MODULATED OPTICAL SIGNALS," each of which is herein incorporated by reference in its entirety for all purposes.

In certain examples, the optical resonator assembly 225 may include multiple optical resonators with different tuning or detuning states. As discussed above, a general phase transition of any size and direction may be detected and distinguished by a combination of any two optical resonators, at least one of which is detuned from the wavelength of the arriving optical signal. In a first example, a tuned optical resonator exhibits a temporary reduction in output signal intensity and the amount of phase transition may be determined by the amount of reduction in output signal intensity. The direction of the phase transition (advance or retreat) may be determined by analyzing the output signal intensity from a detuned optical resonator, e.g., for a positively detuned resonator, a positive peak indicates a positive phase transition and no positive peak (or a minor negative peak) indicates a negative phase transition. In a second example, a positively detuned optical resonator detects positive phase transitions by producing a positive output peak whose amplitude is indicative of the amount of the phase transition, and a negatively detuned optical resonator detects negative phase transitions by producing a positive output peak whose amplitude is indicative of the amount of the phase transition. Accordingly, either of the first example or the second example (each having a pair of optical resonators) may uniquely distinguish both phase advances and phase retreats and the amount of the phase advance or retreat.

Additionally, analysis of the output optical signal from two or more optical resonators may identify whether either is tuned (resonant) (e.g., relatively high output intensity, similar response to both positive and negative phase transitions) and/or detuned. Further, a received optical signal that drifts in wavelength may cause a tuned optical resonator to become a detuned optical resonator, and vice-versa. Accordingly, in certain examples, the signal processing circuit 240 may be configured (e.g., programmed) to analyze output intensities from two or more optical resonators to determine whether they are detuned or whether one is tuned, and interpret the output signals accordingly. While distinction of any general phase transition is achievable by systems and methods described herein having only two optical resonators, various embodiments may operate more robustly having three or more resonators, for example, such that there is no possibility of having to rely on two optical resonators, e.g., that may each be detuned in the same direction relative to an arriving optical signal wavelength. Accordingly, to account for an arriving optical signal having a general wavelength, or to account for an arriving optical signal subject to wavelength drift or variation, or to account for dimensional changes of the optical resonators, e.g., due to temperature, manufacturing tolerance, or the like, in certain embodiments the optical resonator assembly 225 may include three or more optical resonators each having an optical dimension different from the others by some amount, such as but not limited to a fixed dimensional variant, ε, as discussed above. In addition, with knowledge of the wavelength of the arriving modulated optical signal 210, such that a single optical resonator can be appropriately detuned, and calibration of the receiver to the response from the optical resonator, a single detuned optical resonator can be used to detect and distinguish a positive phase transition (e.g., +pi) from a negative phase transition (e.g., −pi).

As discussed above with reference to FIG. 2, the intensity-modulated output optical signal(s) 215 from one or more optical resonators (e.g. one or more etalons 300) in the optical resonator assembly 225 may be converted to an electrical signal by an optical-electrical converter (OEC) 235, which may include a photodetector, such as a photodiode, for example. The output of the OEC 235 may be an amplitude-modulated version of the intensity-modulated optical signal 215, which may be provided to the signal processing circuit 240 for processing. The signal processing circuit 240, which may include components such as an analog to digital converter, correlator, code generator, various amplifiers, filters, or other analog or digital components as would be recognized and appreciated by those skilled in the art, processes the signal received from the OEC 235 to retrieve the information-carrying content of the optical signal 210. Thus, the optical resonator assembly 225 is a phase change detector that can also detect the direction of the phase change. For example, referring again to FIG. 1, in BPSK the optical resonator assembly 225 provides the ability to distinguish whether the phase vector rotated in the positive pi direction (arrow 122) or the negative pi direction (arrow 124). This distinction provides an additional bit of information. Thus, in BPSK, for example, two bits of information can be encoded per symbol, instead of only one bit per symbol, without there being any bandwidth or latency penalties. Accordingly, aspects and embodiments are directed to a path-dependent phase modulation scheme that leverages with the ability of the optical receiver 200 to not only detect a phase change in the arriving optical signal 210, but also to determine the direction of that phase change (e.g., +pi or −pi for a BPSK signal), to encode additional information in a phase-modulated optical signal. Advantageously, because the direction of a phase transition can be determined, embodiments of the path-dependent phase modulation scheme presented herein encode the additional information without adding phase transitions, essentially achieving double the bit rate for the same signal bandwidth. In addition, the approach disclosed herein maintains a constant signal envelope, thereby maintaining the advantages by phase modulation (e.g., over amplitude modulation) with respect to channel noise.

Figure 4:
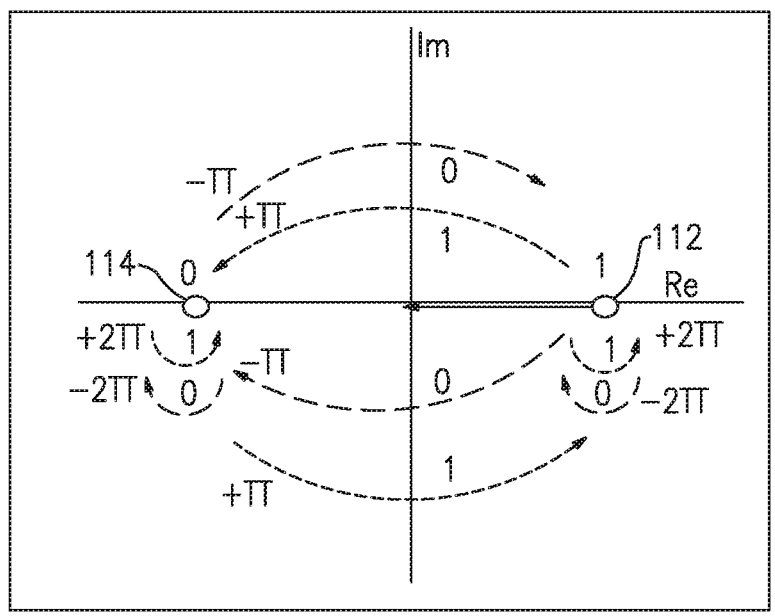
FIG. 4 is a diagram illustrating an example of an enhanced path-dependent BPSK modulation scheme according to aspects of the present invention.

FIG. 4 is a diagram illustrating an example of a path-dependent modulation concept according to certain aspects and embodiments. This example is explained using BPSK; however, those skilled in the art will appreciate, with the benefit of this disclosure, that the approach can be applied similarly to all M-ary and QAM modulation schemes.

According to certain embodiments, an additional bit is assigned based on the direction of rotation to the next phase state. In the examples shown in FIG. 4, a clockwise rotation has been arbitrarily chosen to represent a zero bit (shown in dashed lines) and a counter-clockwise rotation to represent a one bit (shown in dotted lines). The bit represented by the rotation is referred to herein as the path bit, P. The bit represented by the symbol's location is referred to herein as the location bit, L. A complete symbol, S, is formed by concatenating the location bit with the path bit, S=[PL], where L is the lower order bit. Table 1 is a state transition table for an example of this modulation scheme.

TABLE 1

| Symbol | Symbol Value [PL] | | | |
|---|---|---|---|---|
| Location Value | 00 | 01 | 10 | 11 |
| 0 | −2π | −π | +2π | +π |
| 1 | −π | −2π | +π | +2π |

In Table 1, the first column represents the current symbol location bit value. A zero in the first column represents location bit zero at a phase angle of pi radians (114). A one in the first column represents a location bit of one at a phase angle of zero radians (112). The horizontal header [00 01 10 11] represents the symbol value as a function of destination phase state and path to the destination state. The table values represent the direction and degree of rotation in radians that are used to generate a particular symbol value. Table 1 is consistent with the transitions shown in FIG. 4. According to one embodiment, Table 1 can be used as follows: Assume the current symbol location value is zero and the next two bits to be transmitted are 11. The intersection of row zero and column [11] is +pi. This means that the system must advance to the symbol location one state by changing the phase by +pi radians. It should be noted that when the current state and the next state are the same, a 2pi rotation is not needed.

As noted above, in the example shown in FIG. 4 and presented in Table 1, a clockwise rotation has been arbitrarily chosen to represent a zero bit and a counter-clockwise rotation to represent a one bit. It will be readily apparent to those skilled in the art, given the benefit of this disclosure, that Table 1 can be modified to accommodate the opposite case in which a counter-clockwise rotation represents a zero bit and a clockwise rotation represents a one bit. The principles of the modulation scheme disclosed herein apply equally to either scenario, and embodiments are not limited to any one specific arrangement. Further, in the example discussed above, the location bit is the lower order bit; however, in other examples, the location bit may be the higher order bit.

According to certain examples, the following approach can be implemented to apply the path data bit to a standard M-ary or QAM constellation. For M-ary and QAM modulation schemes, there are N symbol locations defined in the symbol constellation. Each location L represents $\log_2(2^N)$ bits. In one example, $L_n$ represents the value of the lower order bits at symbol location n, where n=1, 2, ..., N. A path P is defined as a clockwise or counter-clockwise rotation from one symbol location to another in the complex plane. In one example a path that is a counter-clockwise rotation about the complex plane origin constitutes a positive phase rotation, and path that is a clockwise rotation about the complex plane origin constitutes a negative phase rotation. However, as noted above, in other examples the opposite arrangement can be used. For two paths, of opposite rotation, originating from a particular location $L_1$ in the complex plane and terminating at the location $L_2$ in the complex plane, the path values are complemented. $L_1$ and $L_2$ may be the same or different locations. If $L_1$ and $L_2$ are the same location, the rotation will be +2pi or −2pi. In one example, P determines the highest order symbol bit. The symbol value is determined by concatenating the symbols location value and the path taken to get to a particular symbol. Thus, $S_n$ represents the symbol value of a symbol at position n, with $S_n=[PL_n]$. As discussed above, in other examples, $L_n$ can represent the value of higher order bits, such that $S_n=[L_nP]$.

Figure 5:
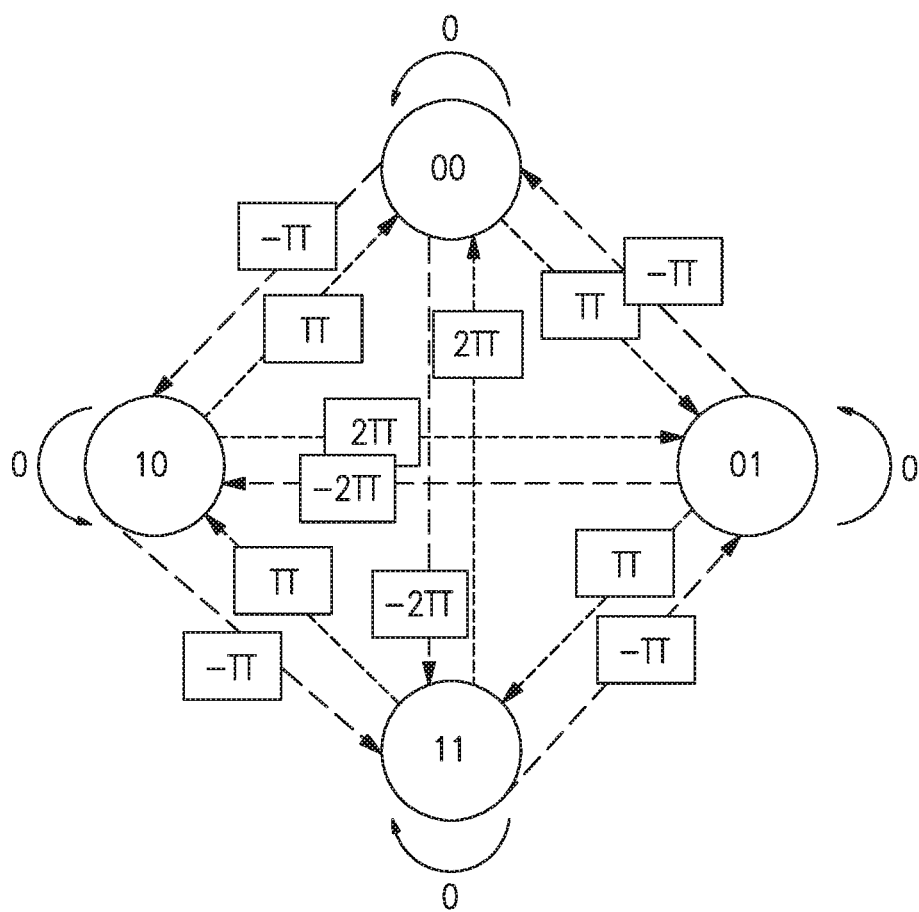
FIG. 5 is a diagram illustrating an example of an enhanced path-dependent phase modulation scheme according to aspects of the present invention.

Table 2 below presents an example of phase rotations used to implement the above-discussed modulation scheme. Table 2 is consistent with the transitions shown in FIG. 5.

TABLE 2

| Current State | Next State | | | |
| --- | --- | --- | --- | --- |
| | 00 | 01 | 10 | 11 |
| 00 | 0 | +π | −π | −2π |
| 01 | −π | 0 | −2π | +π |
| 10 | +π | +2π | 0 | −π |
| 11 | +2π | −π | +π | 0 |

As discussed above, examples of the path-dependent modulation scheme disclosed herein advantageously includes the additional bits of information (the path bit) without increasing the bandwidth of the modulated optical signal and without requiring any changes in the amplitude of the optical signal. That is, the modulation scheme disclosed herein allows for maintaining a constant envelope signal. This may be particularly advantageous and/or desirable because the constant envelope or signal amplitude is a feature that makes phase modulation (PSK) preferable over intensity or amplitude modulation for many applications. Although some conventional modulation techniques have attempted to include an additional bit of information per symbol, these have required the introduction of variations in the signal envelope, which is contrary to the methods typically used in phase modulation. The path-dependent modulation scheme and approaches disclosed herein maintain a constant envelope, thereby maintaining the advantages offered by phase modulation with respect to channel noise. Further, conventional higher-order modulation schemes that provide two bits per symbol, have penalties in bandwidth or latency, that are both avoided with embodiments of the path-dependent phase modulation approach disclosed herein.

Figure 6:
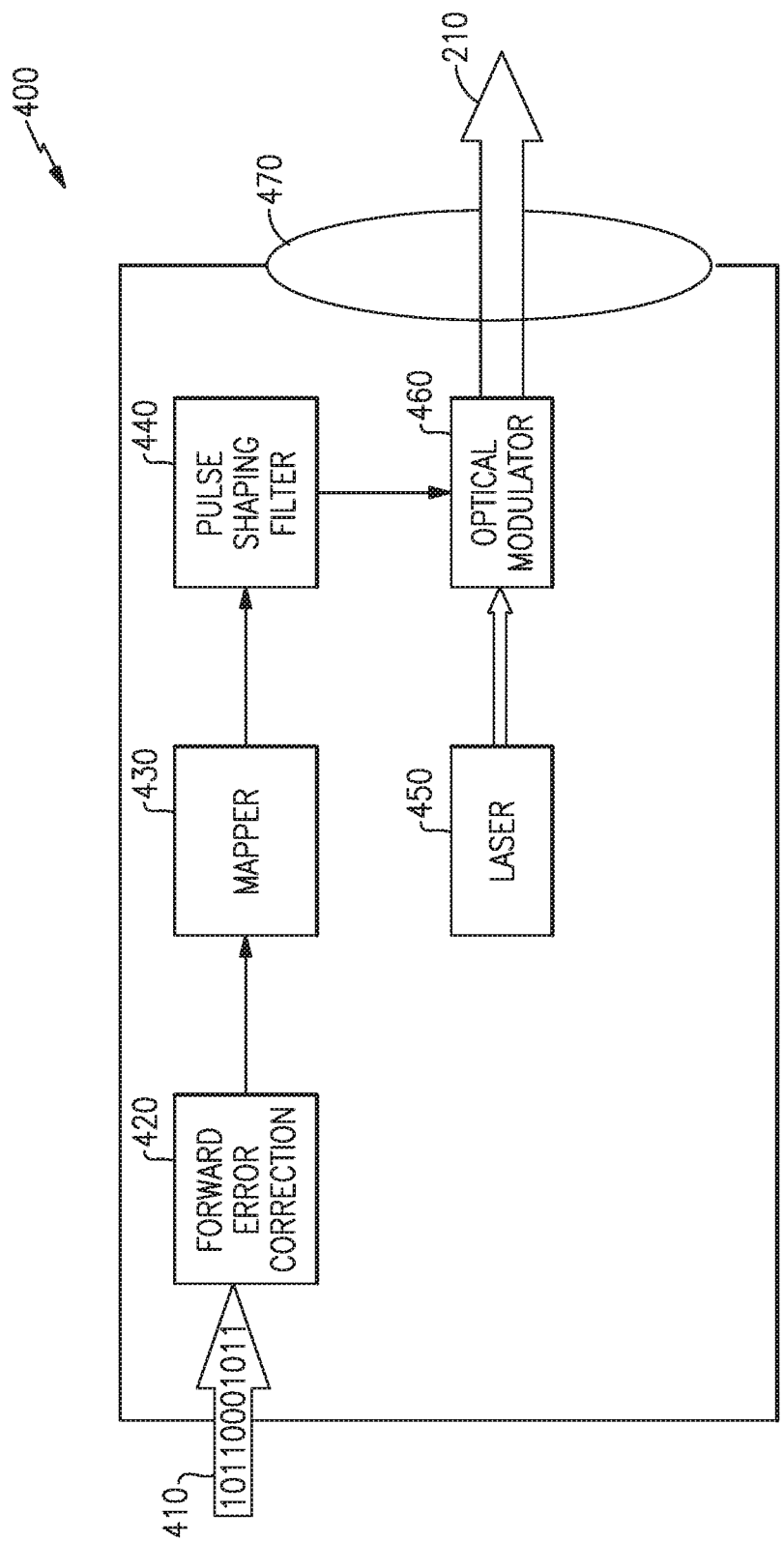
FIG. 6 is a functional block diagram of one example of a transmitter according to aspects of the present invention.

An optical transmitter can be configured to implement examples of the above-discussed modulation scheme, using both path and location bits, to generate the modulated optical signal 210 that may be received and demodulated by embodiments of the receiver 200, for example. FIG. 6 is a functional block diagram of one example of an optical transmitter 400 according to certain embodiments. The transmitter 400 illustrated in FIG. 6 may be combined with the receiver 200 illustrated in FIG. 2 to provide one example of a communication assembly, as will be readily apparent to one of ordinary skill in the art given the benefit of this disclosure.

Though the components of the example optical transmitter 400 shown in FIG. 1 and the optical receiver 200 shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 400 and components of the optical receiver 200 may be implemented as discrete analog, digital, or optical signal lines. Some of the processing operations may be expressed in terms of calculations or determinations by the optical transmitter 400, the optical receiver 200, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 6, one example of an optical transmitter 400 may include an input to receive a data payload 410, a forward error correction (FEC) module 420, a mapping module 430, a pulse-shaping filter 440, an optical source (e.g., a laser) 450, a modulator 460, and optics 470 and an output to provide the modulated optical signal 210.

In the transmitter 400, the FEC module 420 implements forward error correction by adding redundancy to the data with a forward error correcting code, such as a block code or convolution code. For example, the FEC module 420 may repeat one or more bits within the data payload 410 to reduce an effect that the transmission medium may have on the transmitted signal waveform. Accordingly, in various examples the optical transmitter 400 may include the FEC module 420 to control errors that may result from transmitting the data payload 410 through a noisy or lossy medium.

The mapping module 430 maps the data payload to a particular modulation scheme, such as various positions of a particular phase and amplitude constellation. The mapping module 430 may implemented examples of the path-dependent modulation scheme discussed above with reference to FIGS. 4 and 5 and Tables 1 and 2. A pulse-shaping filter 440 may receive output of the mapping module 430 and control the modulator 460 to impose the modulation scheme on the optical source 450 to generate the modulated optical signal 210. In various examples, the modulator 460 may be an electro-optic modulator, and may include the optical source 450, such as a laser. In particular, the optical source 450 may emit a continuous carrier waveform that is modulated in phase for each symbol of the data payload to encode those symbols on the carrier waveform. The transmitter 400 may also include various optics 470 such as one or more mirrors or lenses to output the modulated optical signal 210.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

Accordingly, the foregoing description and drawings are by way of example only, and the scope of the invention should be determined from proper construction of the appended claims, and their equivalents.

What is claimed is:

1. A communications apparatus configured to transmit a modulated signal, comprising:
   a source configured to emit a carrier waveform;
   a modulator configured to modulate the carrier waveform according to a path-dependent phase modulation scheme to produce the modulated signal; and
   a mapping module configured to map a received data payload to the path-dependent phase modulation scheme, each symbol S in the path-dependent phase modulation scheme including a concatenation of at least one location bit L and at least one path bit P.

2. The communications apparatus of claim 1, wherein the at least one location bit corresponds to a current location of the symbol in a symbol constellation corresponding to the path-dependent phase modulation scheme, and the at least one path bit indicates a clockwise or counter-clockwise rotation from a prior location of the symbol to the current location of the symbol in a complex plane of the symbol constellation.

3. The communications apparatus of claim 2, further comprising:
   a pulse-shaping filter configured to control the modulator, based on an output from the mapping module, to impose the path-dependent phase modulation scheme on the carrier waveform to generate the modulated signal; and
   a forward error correction module configured to receive the data payload and to apply a forward error correcting code to the data payload.

4. The communications apparatus of claim 2, wherein the at least one location bit represents a value of lower order bits at the current location of the symbol.

5. The communications apparatus of claim 2, wherein the clockwise or counter-clockwise rotation is a rotation of 180 degrees.

6. The communications apparatus of claim 2, wherein the clockwise rotation represents a zero bit and the counter-clockwise rotation represents a one bit.

7. The communications apparatus of claim 1, wherein the at least one path bit is a highest order bit in the symbol.

8. The communications apparatus of claim 1, wherein the communications apparatus is an optical transmitter, the modulator is an electro-optic modulator, the source is an optical source and the modulated signal is a modulated optical signal.

9. The communications apparatus of claim 1, wherein S=[PL], where L represents $\log_2(2^N)$ bits, there being N symbol locations defined in a symbol constellation corresponding to the path-dependent phase modulation scheme.

10. The communications apparatus of claim 9, further comprising:
    a pulse-shaping filter configured to control the modulator, based on an output from the mapping module, to impose the path-dependent phase modulation scheme on the carrier waveform to generate the modulated signal, each symbol corresponding to a phase transition in the modulated signal, with the at least one location bit, L, identifying an amount of phase change corresponding to the phase transition, and the at least one path bit, P, identifying whether the phase change is positive or negative.

11. The communications apparatus of claim 10, wherein the amount of phase change corresponding to the phase transition is pi radians.

12. The communications apparatus of claim 10, wherein a positive phase change represents a one bit and a negative phase change represents a zero bit.

13. The communications apparatus of claim 1, wherein the at least one path bit P indicates a clockwise or counter-clockwise rotation from a prior location of the symbol to a current location of the symbol.

14. A communications method, comprising:
    generating a carrier waveform;
    modulating, using a modulator, the carrier waveform according to a path-dependent phase modulation scheme to produce a modulated signal; and
    mapping, using a mapping module, a received data payload to the path-dependent phase modulation scheme, each symbol S in the path-dependent phase modulation scheme including a concatenation of at least one location bit L and at least one path bit P.

15. The method of claim 14, wherein the at least one location bit corresponds to a current location of the symbol in a symbol constellation corresponding to the path-dependent phase modulation scheme, and the at least one path bit indicates a clockwise or counter-clockwise rotation from a prior location of the symbol to the current location of the symbol in a complex plane of the symbol constellation.

16. The method of claim 15, further comprising:
    controlling the modulator, based on an output from the mapping module, to impose the path-dependent phase modulation scheme on the carrier waveform to generate the modulated signal.

17. The method of claim 15, wherein the at least one location bit represents a value of lower order bits at the current location of the symbol.

18. The method of claim 14, wherein the at least one location bit indicates an amount of a phase transition in the modulated signal and the at least one path bit indicates a direction of the phase transition.

19. The method of claim 14, wherein each symbol, S, is defined by S=[PL], where L corresponds to the at least one location bit and represents $\log_2(2^N)$ bits, there being N symbol locations defined in a symbol constellation corresponding to the path-dependent phase modulation scheme, and P corresponds to the at least one path bit.

20. The method of claim 14, wherein the at least one path bit P indicates a clockwise or counter-clockwise rotation from a prior location of the symbol to a current location of the symbol.

* * * * *